(12) United States Patent
Nigra

(10) Patent No.: US 7,043,208 B2
(45) Date of Patent: May 9, 2006

(54) METHOD AND APPARATUS TO REDUCE INTERFERENCE IN A COMMUNICATION DEVICE

(75) Inventor: Louis M. Nigra, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 418 days.

(21) Appl. No.: 10/271,280

(22) Filed: Oct. 15, 2002

(65) Prior Publication Data

US 2004/0203458 A1 Oct. 14, 2004

(51) Int. Cl.
*H04B 1/44* (2006.01)
(52) U.S. Cl. ............................ 455/78; 455/295; 455/296
(58) Field of Classification Search ............... 455/73, 455/78, 24, 295, 296, 324; 375/346
See application file for complete search history.

(56) References Cited

U.S. PATENT DOCUMENTS

| | | | |
|---|---|---|---|
| 5,001,747 A | 3/1991 | Sexton | |
| 5,414,766 A | 5/1995 | Cannalire et al. | |
| 5,526,426 A | 6/1996 | McLaughlin | |
| 5,579,347 A | 11/1996 | Lindquist et al. | |
| 5,850,421 A | 12/1998 | Misra et al. | |
| 6,516,183 B1 * | 2/2003 | Hellmark | 455/78 |
| 6,546,099 B1 | 4/2003 | Janse | |
| 2004/0106381 A1 * | 6/2004 | Tiller | 455/73 |
| 2005/0170780 A1 | 8/2005 | Furman | |

FOREIGN PATENT DOCUMENTS

WO WO 01/20795 A2 3/2001

OTHER PUBLICATIONS

Haykin, Simon "Adaptive Filter Theory." Prentice-Hall, Upper Saddle River 3rd Edition, 1996, pp. 50-56.
B. Farhang-Boroujeny, "Adaptive Filters Theory and Applications", 1998, pp. 1-21.

* cited by examiner

*Primary Examiner*—Lee Nguyen
(74) *Attorney, Agent, or Firm*—Brian M. Mancini; Randall S. Vaas

(57) ABSTRACT

An apparatus and method to reduce interference in a communication device particularly effective for second-order interference in direct conversion receiver from a co-located transmitter. This is accomplished by characterizing a transfer function of a transmission path from the transmitter to the receiver and applying this transfer function to the baseband signal from the transmitter to provide an estimation of interference to be expected in the received signal. The estimated interference is subtracted from the receiver baseband signal to reduce interference. Adaptive filtering can also be applied to further minimize interference dynamically.

18 Claims, 6 Drawing Sheets

METHOD AND APPARATUS TO REDUCE INTERFERENCE IN A COMMUNICATION DEVICE

FIELD OF THE INVENTION

The present invention relates to operation of a radio communication device. More particularly the invention relates to a method and apparatus to reduce interference in a radio communication device.

BACKGROUND OF THE INVENTION

In a two-way radio, the frequency bands for receive and transmit operations may overlap for the radio. In this case, when the radio transmitter is operative, signals from the transmitter may be coupled to the radio receiver, causing interference. Although interference can happen when the transmitter and receiver are operating on overlapping carrier frequencies, interference can also occur on interfering intermediate frequencies or baseband frequencies. Direct conversion radios are particularly susceptible to the latter problem. Differences between operational modes may result from the receiver architecture (e.g., superheterodyne), system design (e.g., separate frequency blocks for transmit and receive signals) or transmitter architecture (e.g., direct conversion or frequency offset).

For example, a device can be transmitting on the uplink carrier while monitoring the downlink carrier using the receiver on a nearby frequency, such as is possible in a multimode communication system. In those cases where the downlink frequency is close to the uplink transmission frequency, the communication device can actually interfere with itself. In other words, the transmit power of the device is picked up by, and interferes with, the receiver of the device. In addition, radio self-interference can occur in a Global Positioning System (GPS) wherein the time to correlate a received GPS system signal is long. In this case, the prior art solution is to mute the device transmitter during receiver correlation, which is not acceptable as it limits the use of the device.

In a direct conversion radio, low intermediate frequency (LIF), or very low intermediate frequency (VLIF) radio, a first frequency conversion is performed wherein the carrier RF frequency is demodulated at or near the baseband. Very precise frequency planning is required to implement direct conversion in a radio. Otherwise, intermodulating frequency by-products appear in the form of unwanted spurious signals in an operating passband or receive band of the radio. In particular, where a direct conversion or VLIF receiver operates simultaneously with a co-located transmitter with non-constant envelope modulation, any transmitter signals coupling with the receiver mixer will produce second-order distortion products. The amount of distortion is proportional to the squared-amplitude envelope of the interfering signal, and occurs in the intermediate frequency (IF), which translates to the baseband in direct conversion or VLIF receivers. This can occur even in case where the receiver and transmitter are not functionally related.

In addition, if a received signal level exceeds the operating range of the baseband circuitry of the radio, the receiver performance degrades as a result of the decreasing signal to noise ratio and receiver selectivity. This may occur when interfering signals are very strong compared to the desired on-channel signal and the baseband circuitry becomes saturated as a result of the overload. This results in the desired on-channel signal becoming desensitized. Therefore, it is necessary to limit the interference prior to the baseband circuitry and maintain signal levels within the baseband circuit's operating range. Filter portions of the baseband circuitry can reduce adjacent interference by allowing only the desired on-channel frequency to pass through. However, in direct conversion or VLIF receivers, filtering is of little use as the incoming signal prior to the baseband circuitry comprises the desired monitored signal as well as the interfering signal.

Prior art means currently employed to directly suppress the second order interference involve increasing the isolation between the transmitter and receiver, such as through separate antennas, careful radio architecture layout, increasing selectivity of the receiver, or increasing second-order performance of the mixer. However, the latter may entail reduced gain prior to the mixer, which tends to decrease sensitivity. These prior art means tend to increase cost, weight, size, or decrease performance of the receiver. Another prior art solution seeks to provide simple periodic calibration using DC levels in the IF. However, periodic calibration is still not suitable for the dynamic changes in interference that occurs when an antenna interacts with its surroundings in a mobile environment. In addition, significant DC accuracy is required and DC coupling is required. This is not compatible with direct conversion receivers which strip away the DC component. Still other prior art reject second order interference from a continuous envelope signal with low noise. This is not compatible with the new third generation carrier signals that are amplitude modulated, or those continuous envelope systems with high noise in the receiver IF.

As a result, there is a need for an improved method and apparatus to reduce second order transmit signal interference in a direct conversion, LIF or VLIF receiver. It would also be advantageous to provide this improvement without concern for the radio architecture circuitry layout or component improvements.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENTS

The present invention provides an improved method and apparatus to reduce second order transmit signal interference in a direct conversion, LIF or VLIF receiver. This is accomplished by estimation and compensation of the second order interference products and characterization of the radio circuitry architecture. As a result, the present invention can provide this improvement without concern for the radio architecture circuitry layout or a requirement for component improvements. The present invention advantageously utilizes existing circuitry in combination with simple software and hardware additions for the interference compensation of a receive signal in a communication device.

The present invention is equally applicable to analog or digital signals. As described herein, signals may be in digital or analog form and in some cases can be real or complex (i.e. separate signal components representing the real and imaginary parts). The digital, analog or complex nature of a signal has no impact on the general signal processing concepts described herein, and if the distinction is relevant to a specific process or embodiment, this is explicitly noted. Furthermore, processing necessary for actual implementation may include functions such as sample rate conversion through decimation, interpolation or other means. The application of such is a well-known aspect of the art of digital processing and is not relevant to the present invention.

The present invention can be applied in any radio receiver's first Intermediate Frequency (IF) circuitry that is low enough in frequency to be susceptible to first mixer second order responses to co-located interfering signals. In practice, only direct conversion receivers, VLIF receivers and LIF receivers are susceptible, depending on how poorly the first IF filtering rejects the second order interferer spectrum produced by the first mixer.

The invention provides transmitter interference suppression by subtracting an estimated replica of the interference from the IF. The estimate is obtained primarily by exploiting the a priori knowledge of the exact transmitter baseband complex envelope (phase and amplitude modulation), by a priori knowledge of the approximate processing that occurs as the signal makes its way to the receiver mixer and the ability to very closely approximate the second order process in the mixer that produces the interference in the direct conversion, VLIF, or LIF radio. The estimate of the interference is further refined in a novel way by using adaptive techniques.

Figure 1:
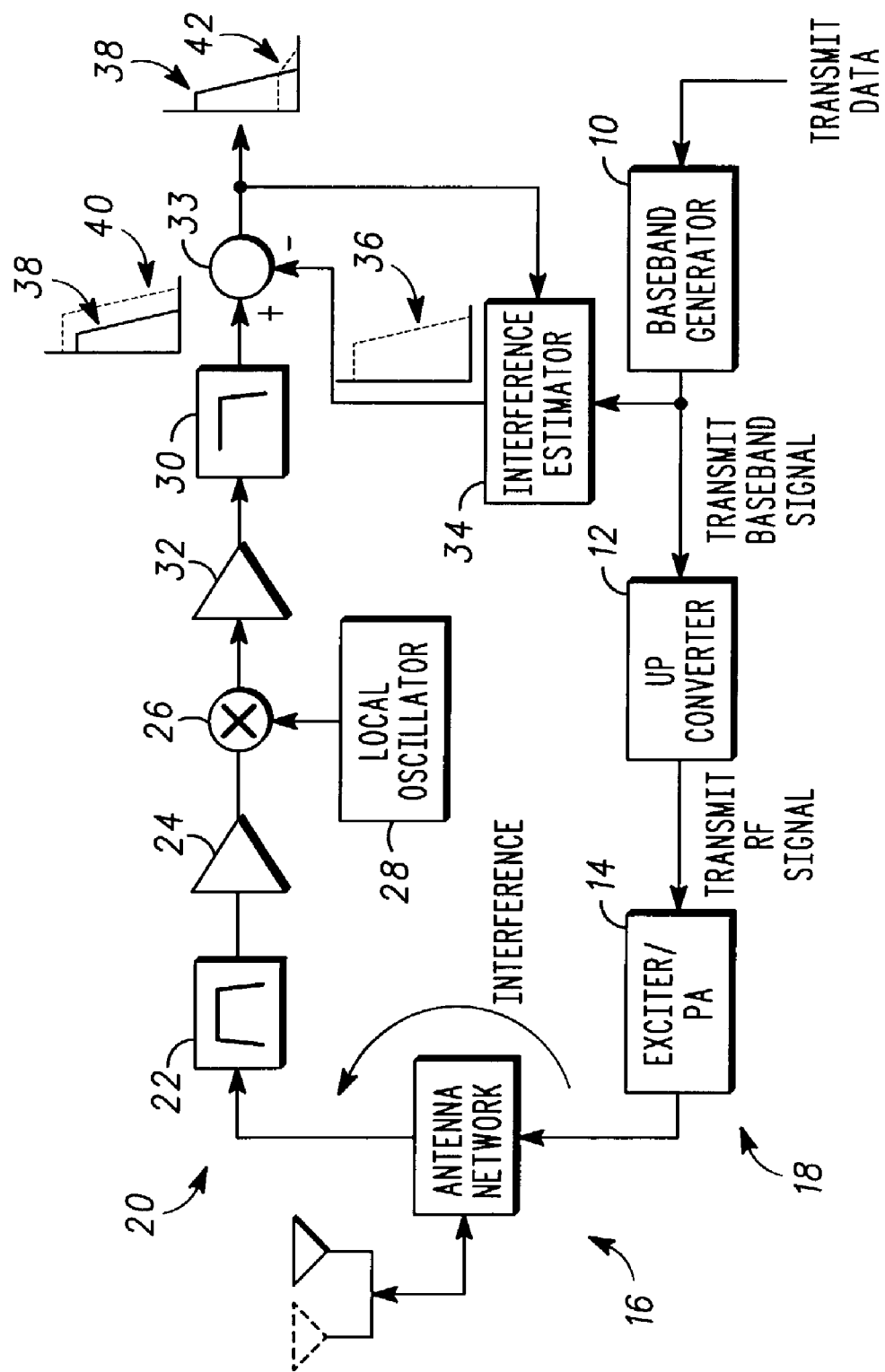
FIG. 1 shows a simplified block diagram of an embodiment of a radio transmitter and receiver, in accordance with the present invention.

Turning to FIG. 1, a block diagram of a wireless communication device in accordance with an embodiment of the present invention is shown. Preferably, this device is a cellular radiotelephone incorporating the present invention. Transmit data is provided to a baseband generator 10, such as a digital signal processor for example. The baseband generator produces the actual complex (phase and amplitude) modulation envelope signal, for the transmitter 18, locally available as the transmit baseband signal in a direct conversion radio for example. This transmit baseband signal modulates the transmit carrier through a frequency up-converter 12 to produce a transmit carrier (RF) signal. The transmit RF signal is amplified by an exciter/power amplifier 14, and is fed to an antenna network 16. The specific embodiments and operation of the transmitter 18, including the baseband generator 10, up-converter 12, and exciter/power amplifier 14, are well known in the art and will not be discussed here. Some of the transmit signal will find its way to the receiver 20 input as interference, due to finite isolation between separate antennas or the use of a single antenna for both transmitter and the affected receiver.

The interference signal passes through, and is modified by, the front end of the receiver, including the net effect of a selectivity represented by a filter 22 and a gain represented by an amplifier 24. At this point, the complex envelope of the interference signal is similar to that of the original transmit baseband signal, but has experienced some distortion, both non-linear (in the Exciter/power amplifier) and linear (phase and amplitude distortion through filtering). Both of these are relatively small effects. However, the transmitted interference signal produces in an output of a mixer 26 a distortion product whose spectrum is at or around DC. This is caused by a square-law response that is essentially independent of frequency offset from the local oscillator 28. This undesired signal's spectrum 40 is at least partially in or near the desired signal's passband 38 in the case of a direct conversion, LIF or VLIF receiver, and is amplified and filtered along with it through a receiver signal processor that includes baseband selectivity 30 and gain 32 stages for filtering and amplifying the receiver signal. Note that FIG. 1 shows a simplified representation of the baseband processing where all the signals after mixer 26 output are, in general, complex. Specifically, in a VLIF or direct conversion configuration, the mixer provides two baseband signals, being the in-phase (I) and quadrature (Q) signals. The composite baseband signal represented in the diagram is, in general, I+jQ. In the case of a LIF configuration, there is no Q signal.

Just prior to the receiver output, an estimate 36 of the second order interference produced in the mixer 26 and modified by the IF response 30 and gain 32 is subtracted in a subtractor 33 from the desired plus interference signal (38 and 40). Preferably, this estimate 36 also includes an estimate of the distortions and non-linearities attributed to the other receiver and transmitter stages prior to the mixer 26. This estimate 36 is provided by an interference estimator 34 which, through static and adaptive processing, optimizes the estimate so as to minimize the residual interference 42 at the receiver output. In effect, the interference estimator statically models the linear and non-linear distortion and non-linear interference effects of the radio elements that produce the second order interference at the mixer 26 output and applies these to the transmit baseband signal. It then adaptively improves this static estimate such that the interference can be subtracted from the receiver baseband signal to provide a desired signal 38 with suppressed interference 42. As an added benefit, the suppression of the interference 42 allows the use of less accurate filtering, gain and mixer stages, since any inadequacy of these elements can be dynamically removed by the interference estimator. The interference estimator provides continuous adaptation to interference using the corrected output signal from subtractor 33 as feedback.

Figure 2:
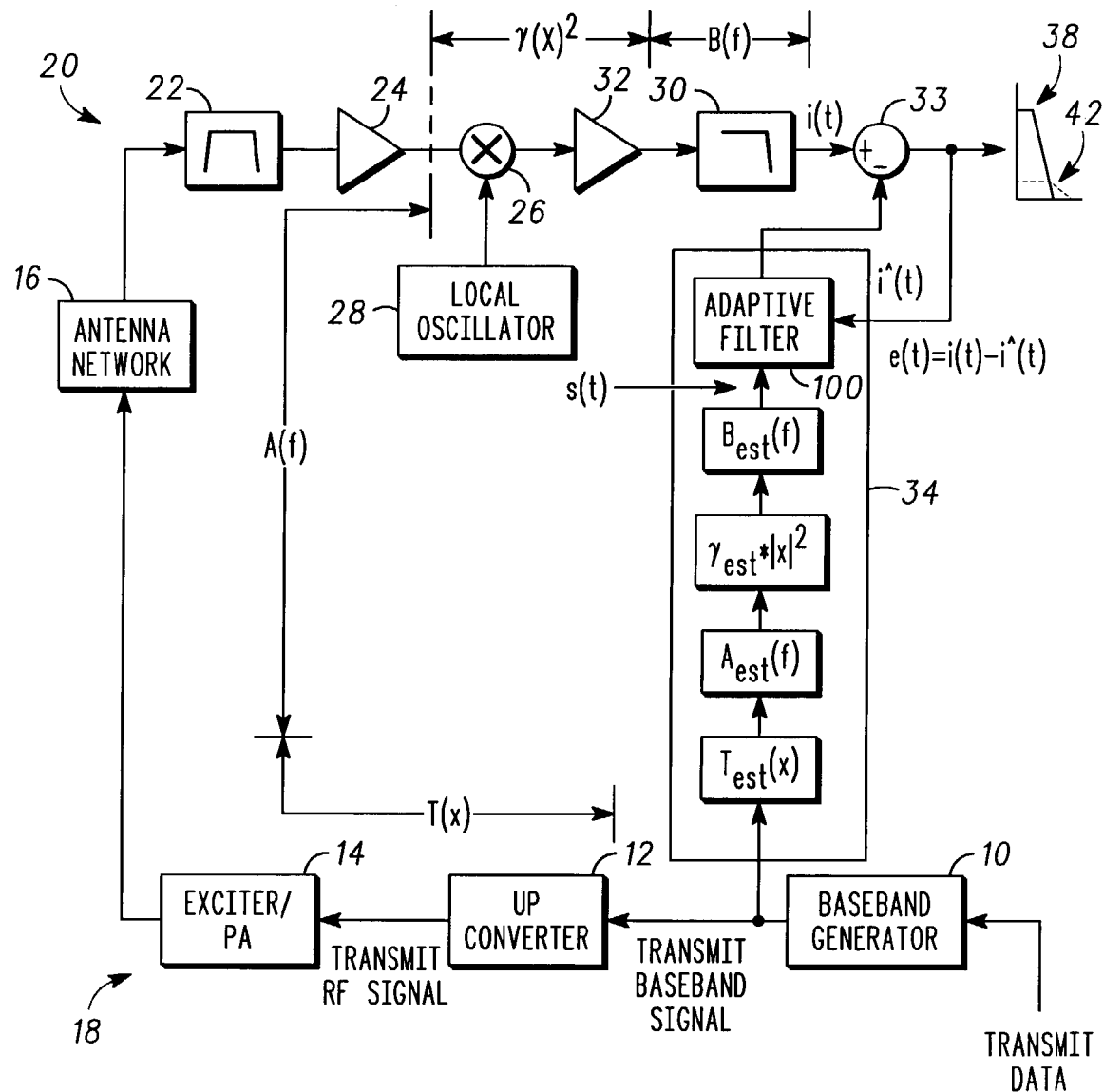
FIG. 2 shows a more detailed block diagram of the radio transmitter and receiver of FIG. 1.

FIG. 2 shows a signal processing block diagram based on the radio of FIG. 1 for the interference and its estimate produced by the transmitter baseband signal. Detail for the interference estimator 34 is provided. The transmit baseband signal is generated from the transmit data by the baseband generator 10, the output being a complex modulation envelope. The effect on this envelope as it passes through the up converter 12 and exciter/pa 14 is represented by a non-linear process T(x) where x represents the time domain input signal to the process, in this case, the output signal of the baseband generation 10. T(x) represents a combination of non-linear and linear effects such as filtering, group delay and non-linear distortion. The effect of antenna network 16 and the receiver front end 22,24 is represented by the linear transfer function, A(f). Non-linear effects on the transmit signal envelope are assumed to be negligible in this portion of the path. The transmitter interference signal then passes through the mixer 26, which, with respect to the second order interference effect that is being addressed here can be represented by an ideal square-law process, $\gamma|x|^2$ where $|x|$ represents the magnitude of the time-varying complex signal envelope of the transmitter signal at the mixer input, and $\gamma$ is a coefficient representing the second order gain (or envelope gain) of the mixer. In general, this coefficient is complex, with the real and imaginary components corresponding to the envelope gain of the in-phase (I) and quadrature (Q) mixer outputs, respectively. The baseband processing of the receiver signal processor is represented by B(f) and is, in general, composed of two nominally matched channels having transfer functions $B_i(f)$, and $B_q(f)$ for the I and Q mixer signals, respectively. For a LIF receiver, as noted above, there would be only one channel, $B_i(f)$.

The interference estimator 34 comprises linear and non-linear transfer functions $T_{est}(x)$, $A_{est}(f)$, $\gamma_{est}(x)^2$ and $B_{est}(f)$, followed by an adaptive filter 100. These transfer functions are approximations to their nominal counterparts $T(x)$, $A(f)$, $\gamma(x)^2$ and $B(f)$, in the signal path to provide the baseline interference estimate, s(t) which serves as the reference for the adaptive filter 100. Note that although the transfer functions can generally be referred to as "static", these transfer functions can be dynamically adjusted based on a priori information of various conditions. For example, $T_{est}(x)$ could include a gain factor that is adjusted based on transmitter attenuator settings, calibration factors and the output of a temperature sensor. The term "static" as used herein refers to the four transfer functions not being adaptive through signal feedback.

The adaptive filter 100 is a process that optimizes the estimate of the interfering signal by monitoring the output signal feedback, e(t), which is the difference between the interference signal, i(t), and the interference estimate, î(t), and adjusting it's filtering parameters, applied to an interference reference through an adaptive control algorithm, to minimize the interference present in the output signal feedback. Adaptive filters themselves are known in the art, and can include an adaptive transversal filter using the LMS (Least Mean Squared) adaptive control algorithm, for example. The adaptive filter 100 shown in FIG. 2 may also be a composite of several adaptive filters and adaptive processes. The two embodiments for adaptive filter 100 described herein are examples of such composites. The adaptive filter 100 continuously adjusts itself dynamically to "fine tune" the combined interference estimator transfer function to optimally match and therefore suppress the interference at the insertion point in the receiver. The insertion point is coupled toward the end of the receiver chain after the receiver signal processing (30,32) and just before the signal feedback point coupled to the adaptive filter, which is passed on to further signal processing, but with the interference suppressed.

Figure 3:
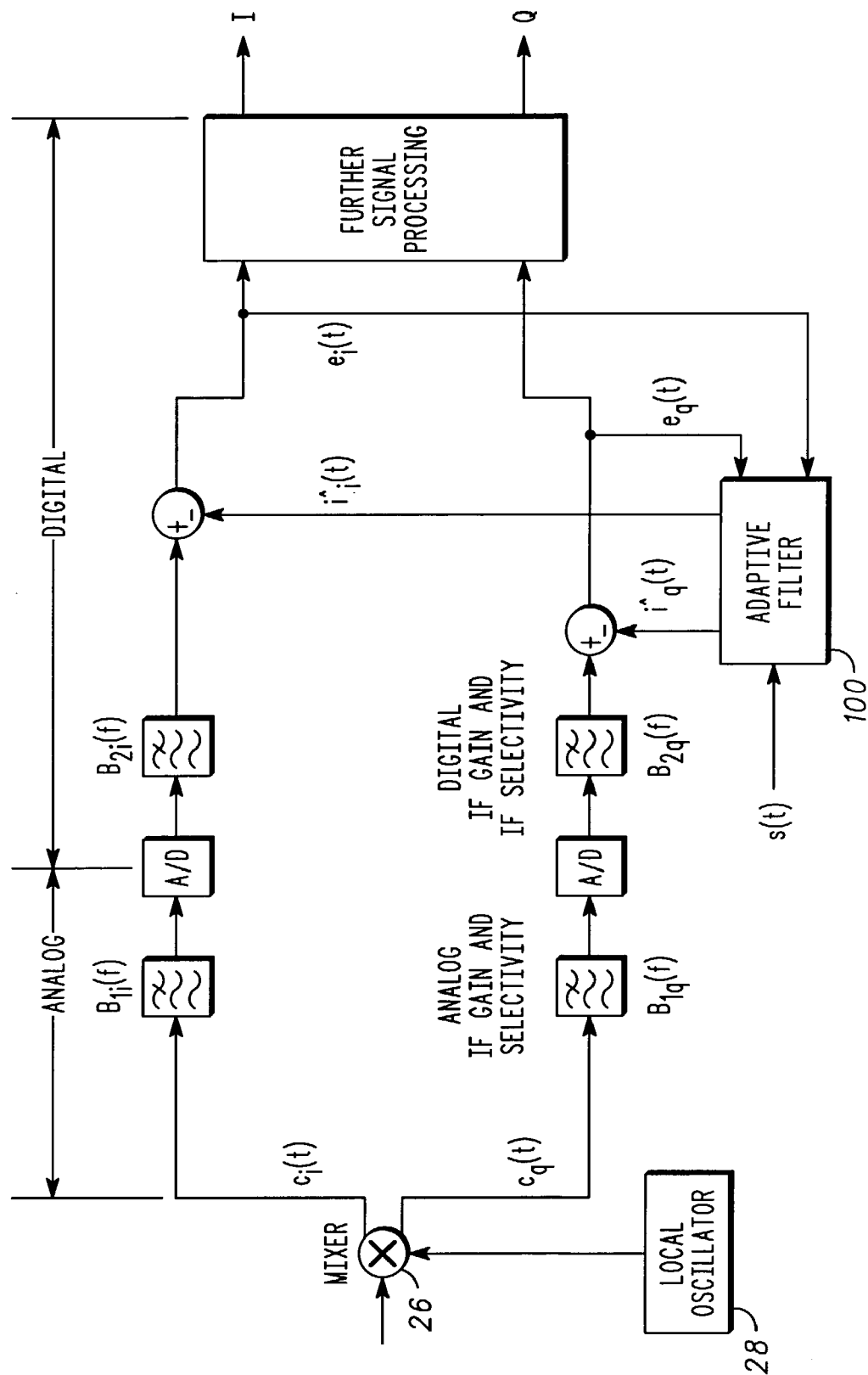
FIG. 3 shows detail of an IF embodiment for the embodiment of FIG. 2.

FIG. 3 show a more detailed baseband IF implementation for the embodiment of FIG. 2. This represents the elements following the mixer 26 as well as the adaptive filter 100 in a typical implementation in a direct conversion, VLIF or LIF receiver. Nominally identical I and Q channels are shown as would be required in a direct conversion or VLIF receiver. In a LIF receiver, those signals and elements related to the Q channel are not present. The further signal processing may include receiver functions such as further filtering and complex frequency conversion (VLIF or LIF).

The mixer 26 has both an in-phase and quadrature baseband output where the converted desired signal band is either nominally centered at zero hertz (direct conversion) or offset in frequency for a VLIF receiver. The second order interference product will always be centered at zero hertz. Mixer 26 is normally of the type where the phase quadrature relationship between I and Q outputs are obtained through controlled phase relationships in the input RF and the local oscillator. In this case, the mixer I and Q output signals, $c_i(t)$ and $c_q(t)$, respectively, each include a desired signal $d_i(t)$ or $d_q(t)$, noise $n_i(t)$ or $n_q(t)$, and a second order interference component $i_i(t)$ or $i_q(t)$:

$$c_i(t)=d_i(t)+n_i(t)+i_i(t)$$

$$c_q(t)=d_q(t)+n_q(t)+i_q(t)$$

The second order interference components are nominally in phase coherence and differ primarily in signal strength alone. This characteristic is essential to the preferred adaptive filter embodiment to be described later. Phase coherence is a direct result of the interference being the product only of a squaring process applied directly to the RF signal into the mixer and not affected by mixer local oscillator phase relationships. With respect to the low frequency components of interest here, the squaring process is sensitive only to the time-varying amplitude envelope of the RF signal, which is well-known in detection theory, since the I and Q mixer elements internal to mixer 26 are excited by RF signals with identical amplitude envelopes. This is in contrast to the noise and desired signals which are directly converted by the quadrature mixer, and are nominally in phase quadrature and nominally matched in signal strength.

The I channel composite mixer signal, $c_i(t)$ passes through analog filtering and analog gain stages prior to analog-to-digital (A/D) conversion. The filtering and gain can involve multiple circuits but is represented as a whole by an element with a linear transfer function of $B_{1i}(f)$. This selectivity is only nominal (i.e. a wide bandwidth relative to the desired signal bandwidth to prevent aliasing in the A/D conversion) and is adequate to prevent interferers from overloading the A/D converter. Following the A/D converter, the estimated interference, $\hat{i}_i(t)$ provided by the adaptive filter 100 is subtracted from the IF signal in the subtractor, whose output is:

$$e_i(t)=[[d_i(t)+n_i(t)+i_i(t)]*b_{1i}(t)]*b_{2i}(t)-\hat{i}_i(t)$$

Where * represents the convolution function, and $b_{1i}(t)$ is the impulse response (Fourier transform) of the transfer function $B_{1i}(f)$. Similarly, $b_{2i}(t)$ is the impulse response of the transfer function $B_{2i}(f)$. The above equation describes the filtering of the composite signal and the subsequent subtraction of the interference estimate.

The filtered error signal is fed back to adaptive filter 100 to serve as the in-phase (real part) error signal. The error signal, with its reduced interference component is also the in-phase or real part of the receiver IF signal and passes on for further signal processing.

The Q channel composite mixer signal, $c_q(t)$ is processed in a similar way, where the error signal serves as the quadrature or imaginary part of the error and receiver IF signals. The quadrature channel error signal is:

$$e_q(t)=[[d_q(t)+n_q(t)+i_q(t)]*b_{1q}(t)]*b_{2q}(t)-\hat{i}hd\ q(t)$$

with the notation conventions previously mentioned.

The adaptive filter is known in the art, but a brief description of its operation is provided here. The adaptive filter will act approximately as a linear filter, processing the local interference estimate, s(t) to produce the complex interference estimate for the two channels. This is not strictly a linear process because the parameters of the filter can be continuously varying as the filter automatically adapts its parameters. It is approximately linear because the rate of adaptation is much slower than the response time of the filter. The adaptive filter's adaptation algorithm adjusts the filter such that the error signal is minimized in some sense. Since the adaptive filter's interference estimate, $\hat{i}_q(t)$ is a modified version of the interference reference s(t), only those components of the composite channel signal that correlate with the reference signal will be affected when the estimate is subtracted from the composite. Therefore, the desired and noise signal components are unaffected.

The adaptive filter can be of a variety of types described in the literature, and for a complex IF (i.e. in-phase and quadrature channels) shown in FIG. 3, the adaptive filter must be of the complex type since the output $\hat{i}_i(t)+j*\hat{i}_q(t)$ and the error input $e_i(t)+j*e_q(t)$ are complex, although the reference signal input, s(t) has no imaginary part in this application, therefore offering opportunities to simplify the implementation.

Figure 4:
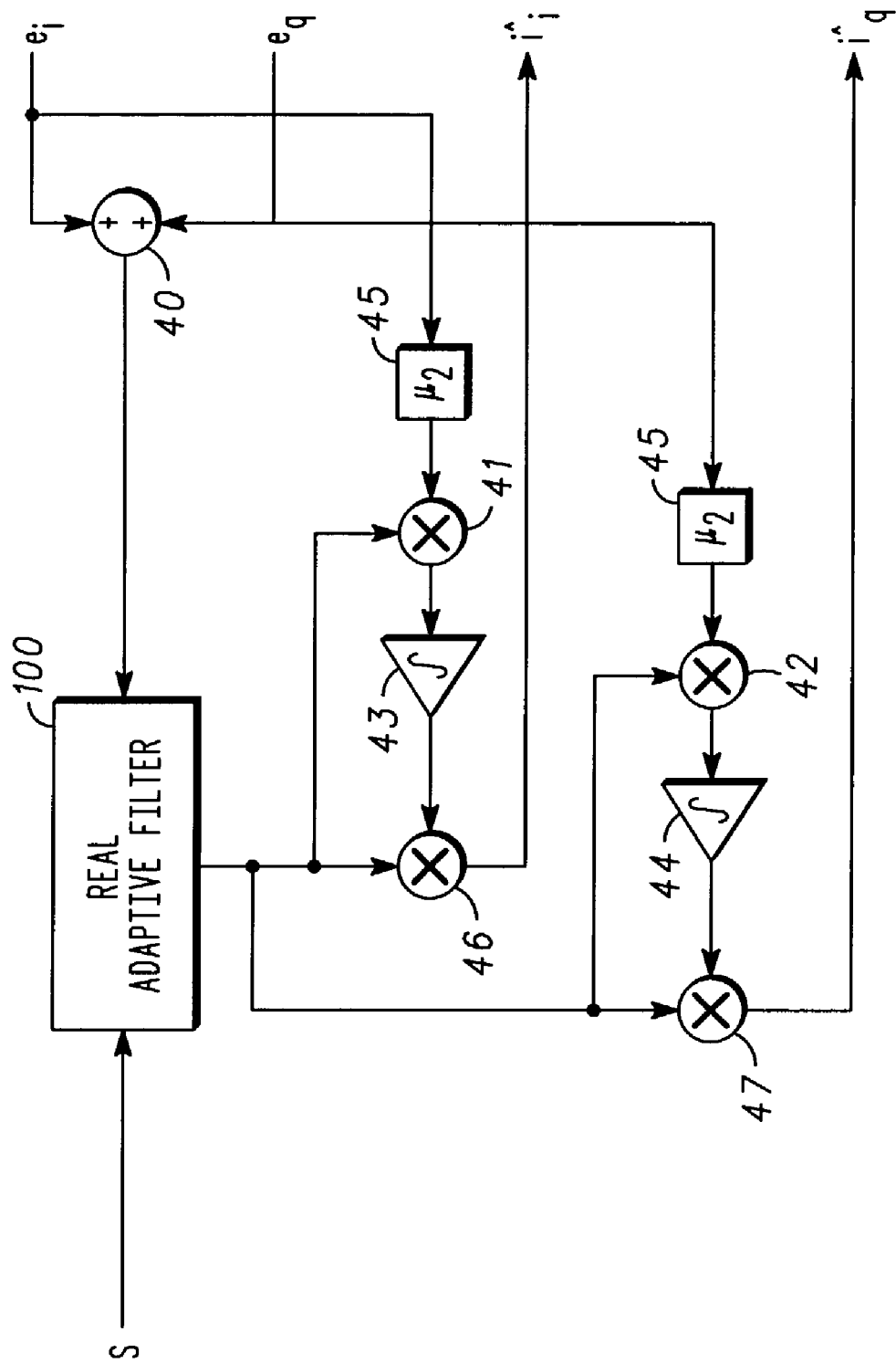
FIG. 4 shows a preferred embodiment of the adaptive filter for an implementation with quadrature IF channels.

A unique implementation of the complex adaptive filter of FIG. 3 that exploits characteristics previously described of the second order interference components and yields a simple implementation is shown in FIG. 4. Here there is one adaptive filter of the real type. The I and Q channel error signals, $e_i$ and $e_q$, are summed in summing block 40 to serve as the error input for the adaptive filter. This exploits the fact that the interference in each channel is in phase and will add constructively and therefore will always provide the strongest residual interference error independent of the relative amplitudes of the interference in each channel. Having the strongest interference error signal will ensure a high-quality estimate of the interference despite large discrepancies in interference level between channels. The output of the adaptive filter will therefore provide a high quality estimate, but the level must also be matched individually for each channel.

In order to scale the interference optimally for each channel, the output of the filter passes through two multipliers, one for the I channel estimate and one for the Q channel estimate. The coefficients are independently and adaptively adjusted by the correlation multiplier 41,42 and integrator 43,44 to minimize the corresponding I or Q channel error. In fact, these two circuits, each comprising the scale factor 45, $\mu_2$, a correlation multiplier 41(42), an integrator 43(44) and a scaling multiplier 46(47) are trivial forms of an LMS adaptive filter having a single tap. Therefore, this embodiment of the adaptive filter function required in the embodiment of FIGS. 2 and 3 is a unique application of three adaptive filters and a combining network which, together exploit the IF signal characteristics of second order interference in a receiver with quadrature IF channels.

In practice, although nominally matched, the two channels will have slight differences in their transfer functions. The embodiment of FIG. 5 corrects for large mismatches in the gain of the two IF channels. However, it will not compensate for differences in the frequency response. It will modify the reference interference signal to approximate an average response, weighted by the relative amplitude of the interference in the channels favoring the channel response with the strongest interference. This will actually provide the best overall performance when one channel's interference is much stronger than the other and mismatched frequency responses will be unimportant in this case. If the interference level is matched in each channel, interference cancellation will be compromised to the extent that the channel responses are mismatched.

Figure 5:
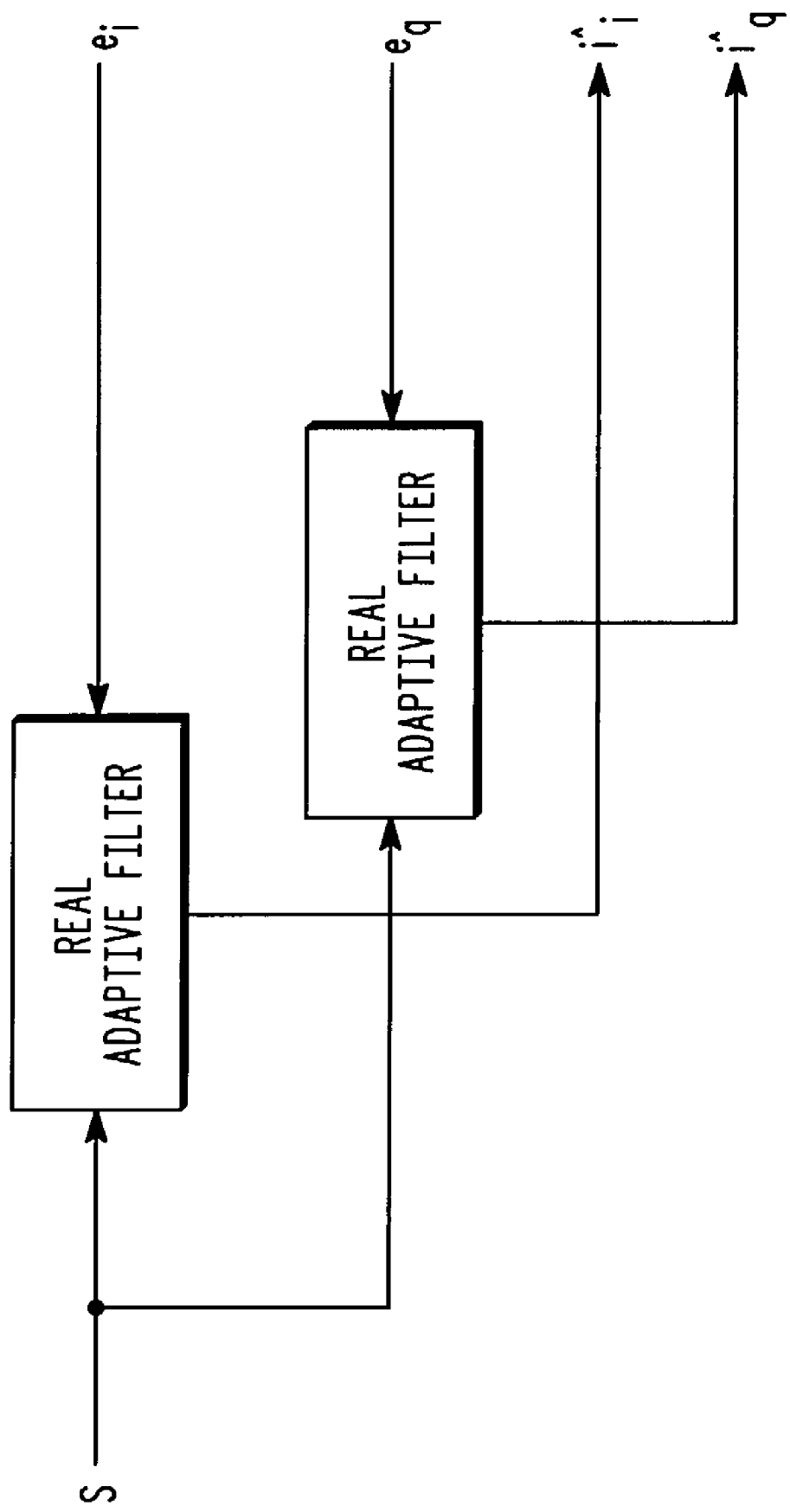
FIG. 5 shows an alternative embodiment of the adaptive filter for an implementation with quadrature IF channels.

If channel frequency response mismatch were severe enough to where the embodiment of FIG. 4 provides inadequate performance, the adaptive filter embodiment of FIG. 5 could be used. Here, there are two independent real adaptive filters, one for the I and one for the Q channel. With this approach, both gain and frequency response mismatch between channels is compensated for.

Figure 6:
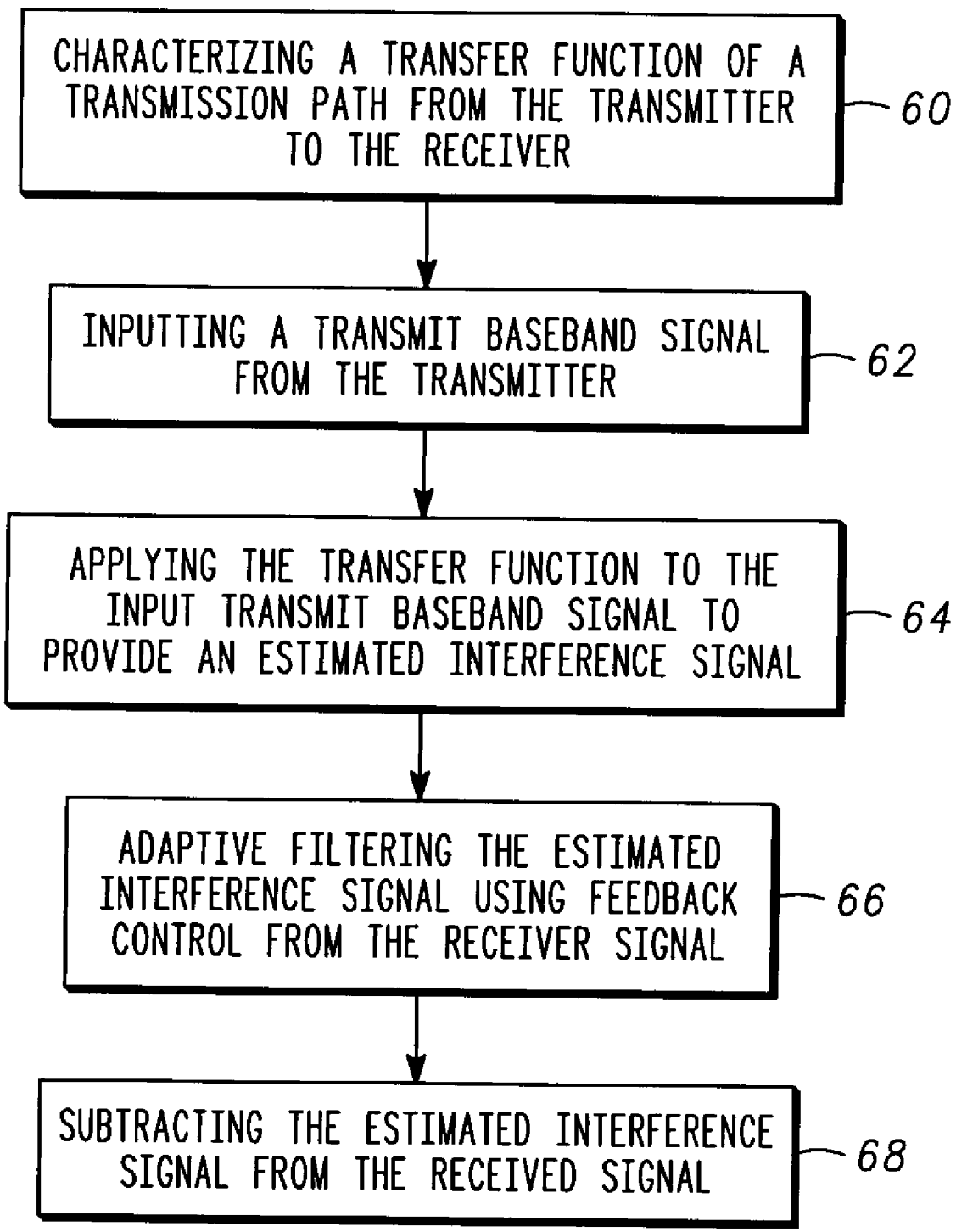
FIG. 6 shows a method for reducing interference, in accordance with the present invention.

The present invention also includes a method for reducing interference from the transmitter in a received signal in a communication device having a co-located transmitter and receiver, as represented by the flow chart of FIG. 6. This method includes a first step 60 of characterizing a transfer function of a transmission path from the transmitter to the receiver. This can include characterizing a receiver front end, mixer (including a second-order non-linear operation thereof), and a receiver baseband transfer function. A next step includes inputting 62 a transmit baseband signal from the transmitter. A next step includes applying 64 the transfer function to the input transmit baseband signal to provide an estimated interference signal. A next step 68 includes subtracting the estimated interference signal from the received signal to reduce the interference. Preferably, this step is applied to the receiver baseband signal, after baseband processing.

The interference signal can be varying, and therefore it is preferred to add a step 66 of adaptive filtering the estimated interference signal using corrected feedback control from the receiver signal to dynamically minimize the interference.

There are several portions of the receiver with which the transmitted signal can interact. The effects of each are different, and the interaction therebetween can carry varying degrees of significance. In general the receiver portion include the receiver front end transfer function which can include the antenna switching, the mixer, and the receiver baseband transfer function which can include the receiver back end. Preferably, the characterizing step includes characterizing each of the receiver front end transfer function, the second-order non-linear operation of a mixer of the receiver, and the receiver baseband transfer function.

Similarly, the transmitter interference signal can be applied, and feedback derived, from any point in the receiver signal path. Preferably, this correction is applied after the mixer, which is the worst offender in contributing to interference. In a preferred embodiment, the characterizing step includes characterizing the transfer function of the receiver front end, mixer and baseband, and the subtracting step is applied after receiver baseband signal processing, and wherein the feedback control of the adaptive filtering step is supplied from the receiver signal after the subtracting stage.

The present invention is unique in the solution provided for the problem of adaptive interference cancellation of second order distortion found in a direct conversion, VLIF or LIF receivers from a co-located transmitter. The present invention is applicable to constant or complex envelope modulation systems and is usable in systems with signal levels well below the noise in the receiver IF. In application, the present invention is best utilized in a direct conversion, VLIF or LIF radio. One important application for this invention is the case of an auxiliary receiver such as a Global Positioning System (GPS) direct conversion, LIF or VLIF receiver integrated with a radio transceiver. A GPS receiver, where the time to correlate a received GPS system signal is long, may require the muting of the device transmitter. For example, in low duty cycle transmission, blanking GPS reception during transmission is one way of dealing with the interference without significant performance degradation. However, blanking GPS reception could cause significant performance degradation in a transceiver whose air interface requires a high transmission duty cycle such as North American Digital Cellular (NADC) and GSM Enhanced General Packet Radio Service (EGPRS), for example, and is not feasible for continuous transmission such as Code Division Multiple Access (CDMA) and Wideband CDMA (WCDMA). The present invention provides a solution to this GPS problem. However, the present invention also has application in any multimode communication system wherein a reception frequency is nearby a simultaneous wideband transmission frequency. In addition, the ever-increasing capabilities of digital signal processor technology in radio devices allows for the simultaneous measurements and operation of the different modes of the operation of the communication device to provide continuous, adaptive, seamless interference control.

Although the invention has been described and illustrated in the above description and drawings, it is understood that this description is by way of example only and that numerous changes and modifications can me made by those skilled in the art without departing from the broad scope of the invention. Although the present invention finds particular use in portable cellular radiotelephones, the invention could be applied to any wireless communication device, including pagers, GPS locators, electronic organizers, and computers. Applicants' invention should be limited only by the following claims.

What is claimed is:

1. In a communication device having a co-located transmitter and receiver, a method for reducing interference from the transmitter in a received signal, the method comprising the steps of:
   characterizing a transfer function of a transmission path from the transmitter to the receiver;
   inputting a transmit baseband signal from the transmitter;
   applying the transfer function to the input transmit baseband signal to provide an estimated interference signal;
   adaptive filtering the estimated interference signal using feedback control from the receiver signal to dynamically minimize the interference; and
   subtracting the estimated interference signal from the received signal to reduce the interference.

2. The method of claim 1, wherein the characterizing step includes characterizing a receiver front end transfer function.

3. The method of claim 1 wherein the characterizing step includes characterizing the second-order non-linear operation of a mixer of the receiver.

4. The method of claim 1, wherein the characterizing step includes characterizing a receiver baseband transfer function.

5. The method of claim 1, wherein the subtracting step is applied to the receiver baseband signal.

6. The method of claim 1, wherein the characterizing step includes characterizing the transfer function of the receiver front end, mixer and baseband, and the subtracting step is applied after receiver baseband signal processing, and wherein the feedback control of the adaptive filtering step is supplied from the receiver signal after the subtracting stage.

7. The method of claim 1, wherein the feedback control of the adaptive filtering step is supplied from the receiver signal after receiver baseband signal processing.

8. The method of claim 1, wherein the adaptive filtering step includes filtering a complex receiver signal with an adaptive filter of the real type and operating on a sum of complex channel error signals.

9. The method of claim 1, wherein the adaptive filtering step includes filtering each complex component of the receiver signal with an adaptive filter of the real type.

10. In a communication device having a co-located transmitter and receiver, a method for reducing interference from the transmitter in a received signal, the method comprising the steps of:
    characterizing a transfer function of a transmission path from the transmitter to the receiver including the receiver front end transfer function and a non-linear operation of the receiver mixer;
    inputting a transmit baseband signal from die transmitter;
    applying the transfer function to the input transmit baseband signal to provide an estimated interference signal;
    adaptive filtering the estimated interference signal using feedback control from the receiver baseband signal to dynamically minimize the interference; and
    subtracting the estimated interference signal from the receiver baseband signal to reduce the interference.

11. The method of claim 10, wherein the characterizing step includes characterizing a receiver baseband transfer function.

12. The method of claim 11, wherein the subtracting step is applied after receiver baseband signal processing, and wherein the feedback control of the adaptive filtering step is supplied from the receiver signal after the subtracting stage.

13. The method of claim 10, wherein the adaptive filtering step includes filtering a complex receiver signal with an adaptive filter of the real type, and operating on a sum of complex channel error signals.

14. The method of claim 10, wherein the adaptive filtering step includes filtering each complex component of the receiver signal with an adaptive filter of the real type.

15. In a communication device having a co-located transmitter and receiver, an apparatus for reducing interference from the transmitter in a received signal, the apparatus comprising:
    an interference estimator that incorporates a transfer function of a transmission path from the transmitter to the receiver;
    a transmit baseband signal coupled from the transmitter to the interference estimator;
    an estimated interference signal provided by the interference estimator, the estimated interference signal derived from the application of the transfer function to the transmit baseband signal;
    a subtractor coupled to the interference estimator and the receiver, the subtracter being operable to apply the estimated interference signal to the receiver to reduce interference in the receiver signal;
    further comprising a receiver baseband processor that filters and applies gain to the receiver signal, and wherein the transfer function includes a receiver transfer function that characterizes the receiver baseband processor.

16. In a communication device having a co-located transmitter and receiver, an apparatus for reducing interference from the transmitter in a received signal, the apparatus comprising:
    an interference estimator that incorporates a transfer function of a transmission path from the transmitter to the receiver;
    a transmit baseband signal coupled from the transmitter to the interference estimator;
    an estimated interference signal provided by the interference estimator, the estimated interference signal derived from the application of the transfer function to the transmit baseband signal;
    a subtracter coupled to the interference estimator and the receiver, the subtracter being operable to apply the estimated interference signal to the receiver to reduce interference in the receiver signal, wherein the subtracter is coupled after a receiver baseband processor, and further comprising a feedback control signal coupled to the adaptive filter from the receiver signal after the receiver baseband processor.

17. In a communication device having a co-located transmitter and receiver, an apparatus for reducing interference from the transmitter in a received signal, the apparatus comprising:
   an interference estimator that incorporates a transfer function of a transmission path from the transmitter to the receiver;
   a transmit baseband signal coupled from the transmitter to the interference estimator;
   an estimated interference signal provided by the interference estimator, the estimated interference signal derived from the application of the transfer function to the transmit baseband signal;
   a subtracter coupled to the interference estimator and the receiver, the subtracter being operable to apply the estimated interference signal to the receiver to reduce interference in the receiver signal, wherein the interference estimator includes an adaptive filter of the real type that operates on a sum of complex channel error signals.

18. In a communication device having a co-located transmitter and receiver, an apparatus for reducing interference from the transmitter in a received signal, the apparatus comprising:
   an interference estimator that incorporates a transfer function of a transmission path from the transmitter to the receiver;
   a transmit baseband signal coupled from the transmitter to the interference estimator;
   an estimated interference signal provided by the interference estimator, the estimated interference signal derived from the application of the transfer function to the transmit baseband signal, wherein the interference estimator includes two real-type adaptive filters operating on each respective complex component of the receiver signal;
   a subtractor coupled to the interference estimator and the receiver, the subtractor being operable to apply the estimated interference signal to the receiver to reduce interference in the receiver signal.

* * * * *

UNITED STATES PATENT AND TRADEMARK OFFICE
CERTIFICATE OF CORRECTION

PATENT NO. : 7,043,208 B2  
APPLICATION NO. : 10/271280  
DATED : May 9, 2006  
INVENTOR(S) : Nigra, Louis M.

Page 1 of 1

It is certified that error appears in the above-identified patent and that said Letters Patent is hereby corrected as shown below:

Claim 10, Column 10, line 9

Delete "die" and replace with the

Claim 15, Column 10, line 45

Delete "subtracter" and replace with subtractor

Claim 16, Column 10, line 66 and 67

Delete "subtracter" and replace with subtractor

Signed and Sealed this

Twenty-second Day of August, 2006

JON W. DUDAS  
*Director of the United States Patent and Trademark Office*